United States Patent
Rago et al.

(10) Patent No.: US 11,232,596 B2
(45) Date of Patent: Jan. 25, 2022

(54) SEARCH QUALITY IMPROVEMENT USING COLOR SYNONYMS

(71) Applicant: Reflektion, Inc., San Mateo, CA (US)

(72) Inventors: Alejandro Miguel Rago, Tandil (AR); Amar Chokhawala, Saratoga, CA (US); Vivek Gupta, San Jose, CA (US)

(73) Assignee: REFLEKTION, INC., San Mateo, CA (US)

( * ) Notice: Subject to any disclaimer, the term of this patent is extended or adjusted under 35 U.S.C. 154(b) by 328 days.

(21) Appl. No.: 15/975,594

(22) Filed: May 9, 2018

(65) Prior Publication Data

US 2019/0347830 A1    Nov. 14, 2019

(51) Int. Cl.
| | | |
|---|---|---|
| G06T 7/90 | (2017.01) | |
| G06F 16/951 | (2019.01) | |
| G06F 16/583 | (2019.01) | |

(52) U.S. Cl.
CPC ............ G06T 7/90 (2017.01); G06F 16/5838 (2019.01); G06F 16/951 (2019.01)

(58) Field of Classification Search
CPC .......... G06F 16/5838; G06F 16/24578; G06F 16/248; G06F 16/144; G06F 16/2468; G06F 16/3338; G06F 16/434; G06F 16/5854; G06F 16/951; G06T 7/90
USPC ....................................... 707/722, 733, 772
See application file for complete search history.

(56) References Cited

U.S. PATENT DOCUMENTS

| | | | | |
|---|---|---|---|---|
| 9,424,598 | B1* | 8/2016 | Kraft | G01C 21/206 |
| 2014/0188842 | A1* | 7/2014 | Vuong | G06F 16/5838 |
| | | | | 707/722 |
| 2015/0324394 | A1* | 11/2015 | Becker | G06F 16/24578 |
| | | | | 707/733 |
| 2015/0379608 | A1* | 12/2015 | Dorner | G06Q 30/0631 |
| | | | | 705/26.7 |
| 2016/0132498 | A1* | 5/2016 | Wang | G06F 16/24578 |
| | | | | 382/165 |
| 2016/0140146 | A1* | 5/2016 | Wexler | G06F 16/5846 |
| | | | | 707/741 |
| 2016/0300118 | A1* | 10/2016 | Murray | G06F 16/50 |
| 2017/0270620 | A1* | 9/2017 | Haitani | G06Q 50/01 |
| 2018/0146175 | A1* | 5/2018 | Mui | G01J 3/52 |
| 2018/0158128 | A1* | 6/2018 | Dorner | G06Q 30/0643 |
| 2019/0019314 | A1* | 1/2019 | Akanksha | G06T 7/90 |
| 2019/0236406 | A1* | 8/2019 | Blatt | G06F 16/5838 |
| 2019/0347830 | A1* | 11/2019 | Rago | G06F 16/951 |

* cited by examiner

Primary Examiner — Dangelino N Gortayo
(74) Attorney, Agent, or Firm — David R. Stevens; Stevens Law Group

(57) ABSTRACT

Example search quality improvement systems and methods are described. In one implementation, a search implementation engine receives a request for an item that includes a first color. The search implementation engine identifies a color representation associated with the first color and determines a second color perceptually similar to the first color based on the color representation. The search implementation engine then identifies an instance of the item having a second color and communicates data associated with the instance of the item to a source of the request.

20 Claims, 7 Drawing Sheets

| Color Name | RGB Values (R, G, B) |
|---|---|
| Blue | (0, 0, 255) |
| Navy | (0, 0, 128) |
| Aqua Marine | (127, 255, 212) |
| Light Blue | (173, 216, 230) |
| Midnight Blue | (25, 25, 112) |
| Dark Red | (139, 0, 0) |
| Fire Brick | (178, 34, 34) |
| Coral | (255, 127, 80) |
| Misty Rose | (255, 228, 225) |

FIG. 5

| Color 1 | Color 2 | Delta E (ΔE '00) | Color Similarity |
|---|---|---|---|
| Blue | Navy | 8.86 | Very Similar |
| Navy | Light Blue | 39.53 | Not Similar |
| Navy | Midnight Blue | 5.12 | Extremely Similar |
| Dark Red | Blue | 46.47 | Not Similar |
| Dark Red | Fire Brick | 5.71 | Extremely Similar |
| Dark Red | Coral | 19.98 | Somewhat Similar |
| Misty Rose | Coral | 22.44 | Minimal Similarity |

FIG. 6

| COLOR 1 | COLOR 2 | DELTA E (ΔE '00) | COLOR SIMILARITY |
|---|---|---|---|
| RED | RED | 0.00 | IDENTICAL |
| RED | BRICK RED | 11.006145890090368 | SIMILAR |
| RED | CRIMSON | 12.924149523895334 | SIMILAR |
| RED | CRANBERRY | 10.014236627111726 | SIMILAR |
| RED | MAROON | 15.01400894891415 | SAME COLOR FAMILY |
| RED | CANDY APPLE RED | 3.3745706465202283 | VERY SIMILAR |
| RED | CORAL | 11.054215495756743 | SIMILAR |
| RED | CARDINAL | 12.985192574590954 | SIMILAR |
| RED | ORANGE RED | 5.463934232403972 | VERY SIMILAR |
| RED | TOMATO | 7.1303763782051774 | VERY SIMILAR |
| RED | LIGHT CORAL | 17.11633682065933 | SAME COLOR FAMILY |
| RED | DARK SALMON | 16.550471264491705 | SAME COLOR FAMILY |

FIG. 7

SEARCH QUALITY IMPROVEMENT USING COLOR SYNONYMS

TECHNICAL FIELD

The present disclosure relates to systems and methods that produce improved search results using color synonyms.

BACKGROUND

Many colors with different names may appear similar to human eyes. For example, "navy blue" and "midnight blue" may appear similar to people viewing the colors. When searching for an item, a user may enter a search request that includes a color. For example, if a user is looking for a blue t-shirt, they may enter a request similar to "dark blue men's t-shirt." If a search engine or other system cannot find an exact match for "dark blue", the search engine may not generate accurate or complete results. As a result, the user entering the search request may not receive accurate results or may be frustrated by the incomplete search results.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 5 is a table illustrating example color names and the associated RGB values.

FIG. 6 is a table illustrating similarities between multiple pairs of colors.

FIG. 7 is a table illustrating similarities between the color red and other color names.

DETAILED DESCRIPTION

Figure 1:
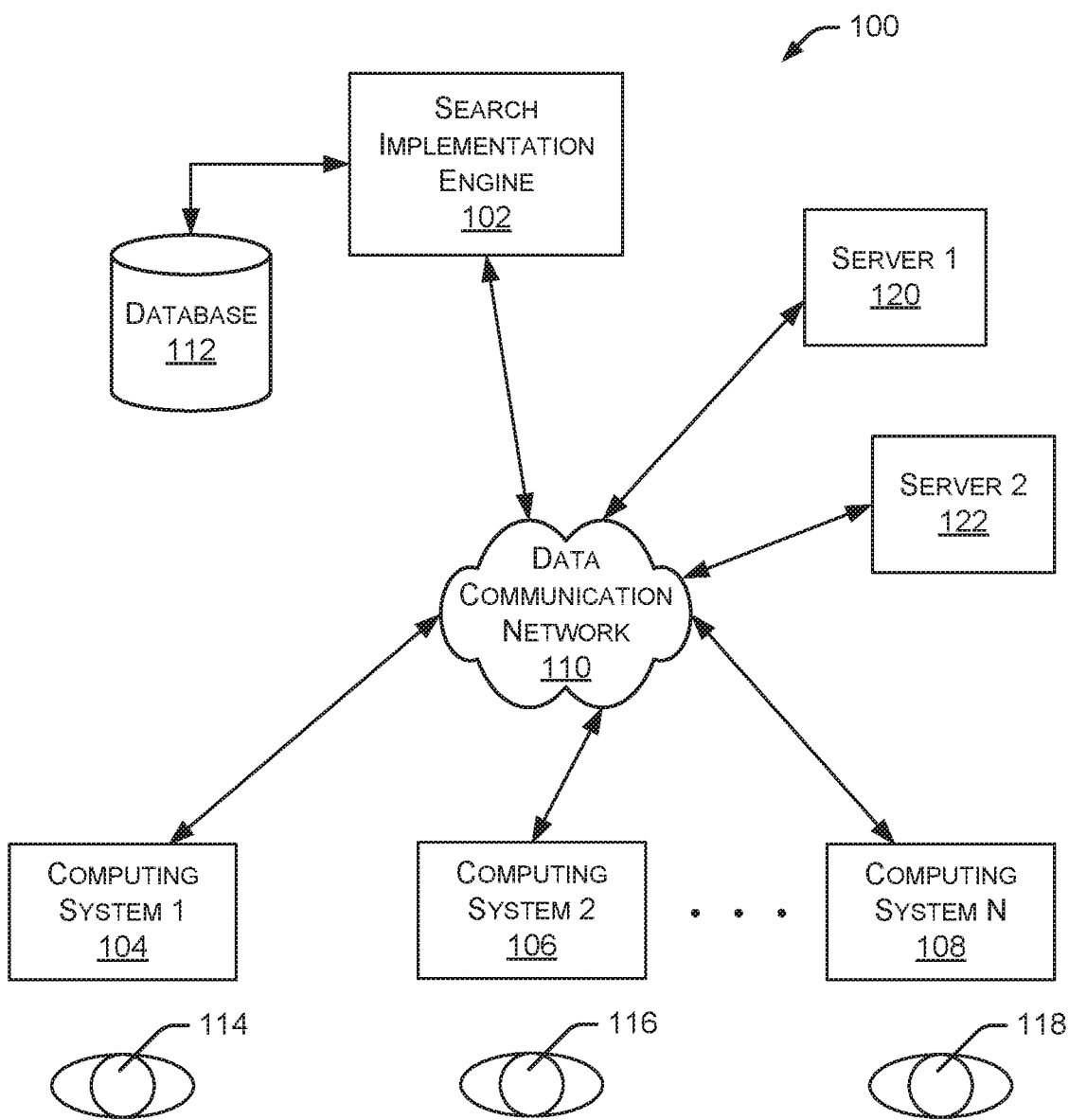
FIG. 1 is a block diagram illustrating an environment within which an example embodiment may be implemented.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an environment 100 within which an example embodiment may be implemented. As shown in FIG. 1, a search implementation engine 102 and multiple computing systems 104, 106, and 108 are coupled to a data communication network 110. Additionally, servers 120 and 122 are coupled to data communication network 110. Servers 120, 122 include any type of server, such as web-based servers, that contain any type of data or other information. In some embodiments, servers 120, 122 contain product information, service information, or other data that may be accessed as part of a search request.

As discussed herein, search implementation engine 102 receives search requests from one or more computing systems 104-108 (or from one or more servers 120, 122). For example, a particular search request may include a color, such as "I want a blue t-shirt." In some embodiments, search implementation engine 102 stores data associated with the search requests, color information, and other data in a database 112. In particular implementations, search implementation engine 102 is implemented in a server or other computing device (or combination of computing devices) capable of communicating with computing systems 104-108 via data communication network 110.

Data communication network 110 includes any type of network topology using any communication protocol. Additionally, data communication network 110 may include a combination of two or more communication networks. In some embodiments, data communication network 110 includes a cellular communication network, the Internet, a local area network, a wide area network, or any other communication network. Computing systems 104-108 may include any type of computing device, such as a desktop computer, a laptop computer, a mobile device, a microprocessor-based or programmable consumer electronic device, a network PC, a minicomputer, a mainframe computer, a PDA, a smartphone, a tablet, and the like. As discussed herein, users interact with a particular computing system 104-108, to enter search requests and other data. In the example of FIG. 1, a first user 114 interacts with computing system 104, a second user 116 interacts with computing system 106, and a third user 118 interacts with computing system 108. Although three computing systems 104-108 and three users 114-118 are shown in FIG. 1, alternate embodiments may include any number of computing systems and any number of users interacting with the computing systems.

In some embodiments, search implementation engine 102 and computing systems 104-108 are each located in a different geographic location. For example, search implementation engine 102 may be located at a first geographic location associated with a business and each computing system 104-108 is located at a different geographic location associated with a user's current location. In other embodiments, computing systems 104-108 may be located in the same geographic location, such as the same building, campus, and the like. In particular implementations, search implementation engine 102 and computing systems 104-108 are located in the same geographic location or a similar geographic area.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
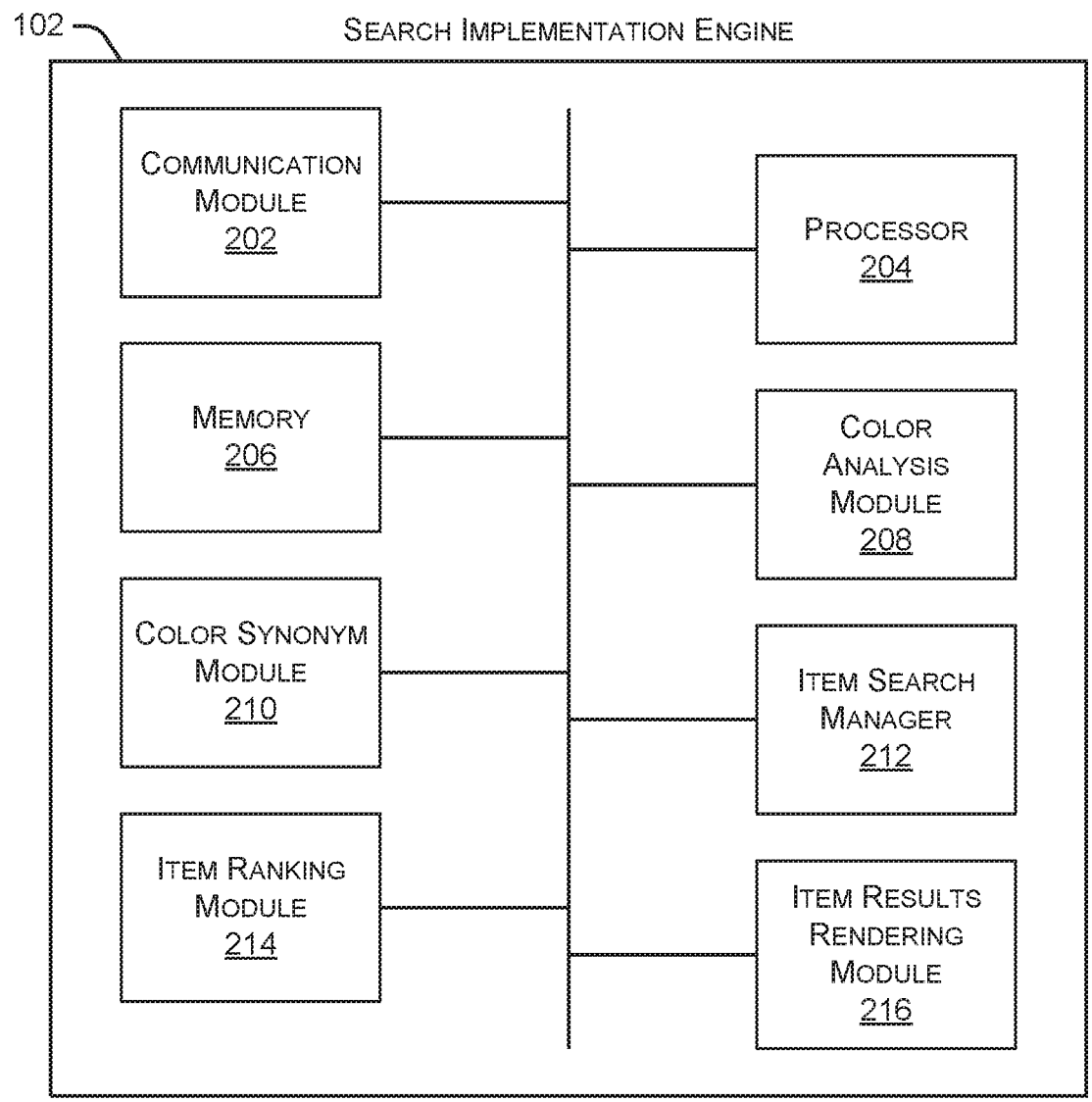
FIG. 2 is a block diagram illustrating an embodiment of a search implementation engine.

FIG. 2 is a block diagram illustrating an embodiment of search implementation engine 102. As shown in FIG. 2, search implementation engine 102 includes a communication module 202, a processor 204, and a memory 206. Communication module 202 allows search implementation engine 102 to communicate with other systems, such as computing systems 104-108, database 112, and the like. Processor 204 executes various instructions to perform the functionality provided by search implementation engine 102, as discussed herein. Memory 206 stores these instructions as well as other data used by processor 204 and other modules and components contained in search implementation engine 102.

Additionally, search implementation engine 102 includes a color analysis module 208 that identifies various colors and similarities between different colors having different names or different descriptors. As discussed herein, if a search query is requested for a "navy blue t-shirt", color analysis module 208 may find other colors that are similar to "navy blue" but have different names or descriptors. For example, "dark blue" or "deep blue" may describe colors that are perceptually similar to "navy blue." A color synonym module 210 performs various procedures to identify colors that are perceptually similar to a requested color. For example, color synonym module 210 may identify name and RGB (Red, Green, and Blue) composition data associated with a requested color, then calculate color representations associated with the requested color. The RGB composition data is associated with a mathematical representation that helps to characterize colors in an unequivocal format. Additionally, several algebraic operations can be performed with this representation, such as computing perceptual similarity between colors. Based on the color representations, color synonym module 210 identifies multiple color synonyms associated with the requested color. As used herein, "color synonyms" refer to perceptually similar colors. In some embodiments, color synonyms are perceptually similar to a human viewing the multiple colors.

In some embodiments, color analysis module 208 and color synonym module 210 may perform some overlapping functions. For example, "color analysis" may refer to identifying colors and their similarities from a text query, search request, and the like. In some embodiments, color analysis module 208 determines the RGB representation of a color inputted in a text string. Then, color synonym module 210 discovers synonyms associated with the RGB color representation determined by color analysis module 208. As discussed herein, the synonyms are colors that are perceptually similar to the RGB color representation based on color metrics and the like. Color synonym module 210 outputs the names and similarity scores of the synonyms.

Search implementation engine 102 also includes an item search manager 212 that searches for items, information, images, data, and the like. In some embodiments, item search manager 212 searches for items, information, images, data, etc. based on a received search request and color synonyms identified by color synonym module 210. In other embodiments, item search manager 212 searches for items, information, images, data, etc. based a received search request and any other data or search parameters. Item search manager 212 generates a list of multiple results, which are ranked by item ranking module 214. For example, item ranking module 214 may rank multiple items based on a similarity of an item's color to the color included in the received search request. In other embodiments, item ranking module 214 may rank multiple items based any number of different factors, which may or may not include color similarity. For example, a search for a "dark blue jacket" can be extended to include "navy jacket" or "electric blue jacket", but the first synonym will have a higher ranking in the listing of results than the second synonym because the first synonym has a greater similarity with the search query than the second synonym. An item results rendering module 216 renders a listing of items in the prioritized order determined by item ranking module 214. The rendered listing of items may be displayed on a display device, stored for future access or communicated to a computing system (e.g., computing system 104, 106, or 108) for display to a user of the computing system.

Figure 3:
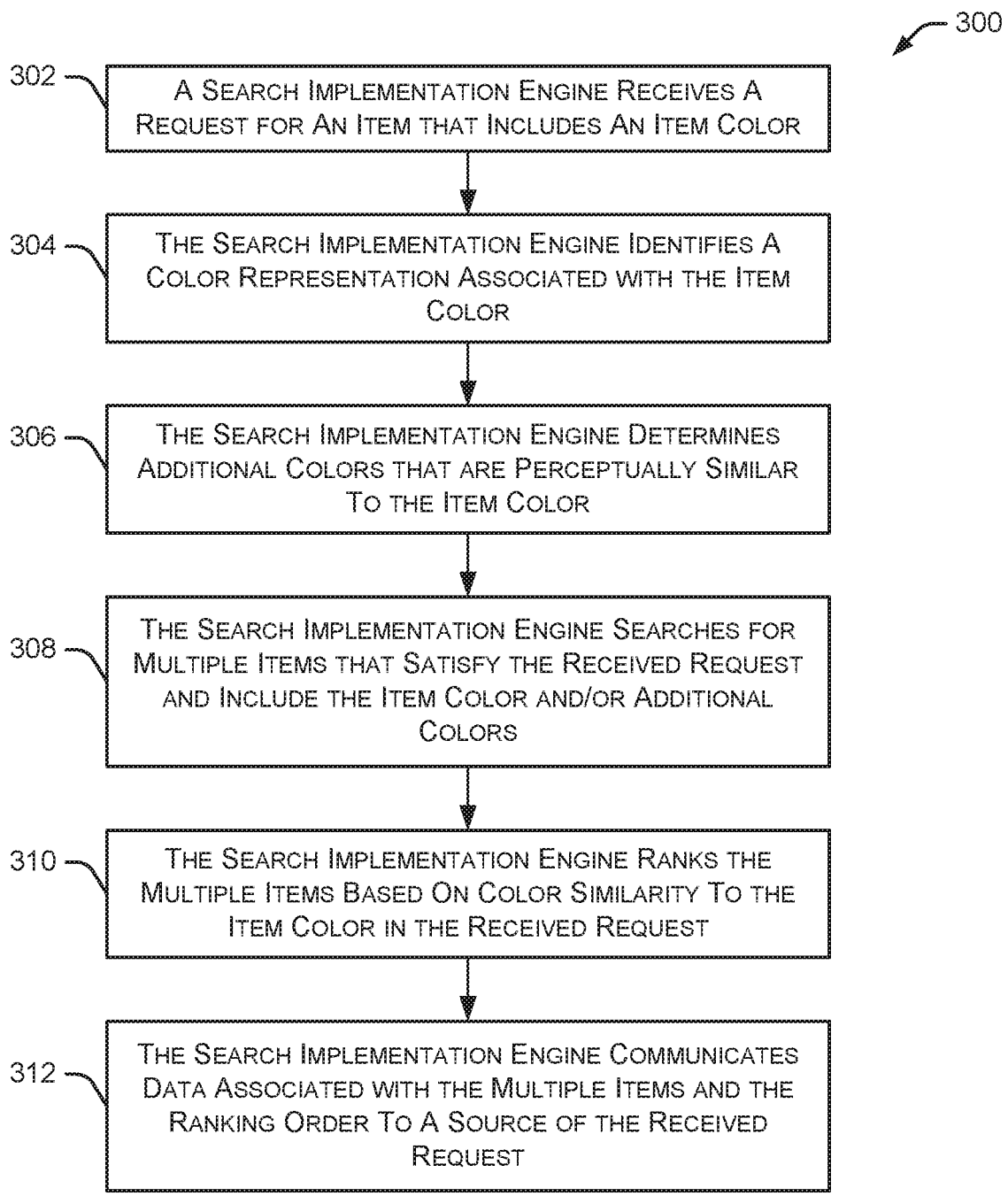
FIG. 3 is a flow diagram illustrating an embodiment of a method for producing improved search results using color synonyms.

FIG. 3 is a flow diagram illustrating an embodiment of a method 300 for producing improved search results using color synonyms. Method 300 starts as a search implementation engine receives 302 a request (e.g., a search request) for an item that includes an item color. Example requests include "a red dress shirt," "brown or tan sandals," "a blouse with red and blue," "a dark tie," and the like. As shown in these examples, a particular request may contain one or more item colors, or may not mention a specific color. In some embodiments, the request is received from a computing system that is remote from the system implementing the search implementation engine. The search implementation engine identifies 304 a color representation associated with the item color (or multiple color representations if the search includes multiple colors). As discussed herein, a color representations may include a specific numerical value associated with a particular color. In some embodiments, a color metric may be a distance measurement, such as a formula, to compare two colors expressed in a particular representation (e.g., RGB, LAB, and the like).

Method 300 continues as the search implementation engine determines 306 additional colors that are perceptually similar to the item color. For example, perceptually similar colors may have similar color representations and/or similar color features. Additional details regarding determining perceptually similar colors are discussed below. The method continues as the search implementation engine searches 308 for multiple items that satisfy the received request and include the item color and/or one of the additional (perceptually similar) colors. Any number of data sources and types of data sources may be used to search for multiple items that satisfy the received request and include the item color and/or one of the additional colors. When accessing data associated with one or more items, the data associated with the one or more items may include, for example, an item color, an item size, an item style, an item description, and the like. In some embodiments, the search implementation engine identifies a particular instance of an item having at least one of the perceptually similar colors. The search implementation engine then ranks 310 the multiple items based on color similarity to the item color in the received request. In some embodiments, the multiple items are ranked exclusively based on the color similarity. In other embodiments, the multiple items are ranked based on a combination of color similarity and the relevance (or similarity) of keywords or other terms used in the search request. The search implementation engine continues by communicating 312 data associated with the multiple items and the ranking order to a source of the received request. As discussed herein, the source of the received request may be a remote computing system, such as computing system 104, 106, or 108 shown in FIG. 1. In some embodiments, the data communicated to the computing system may be formatted in a manner that can be easily rendered or displayed by the computing system.

Figure 4:
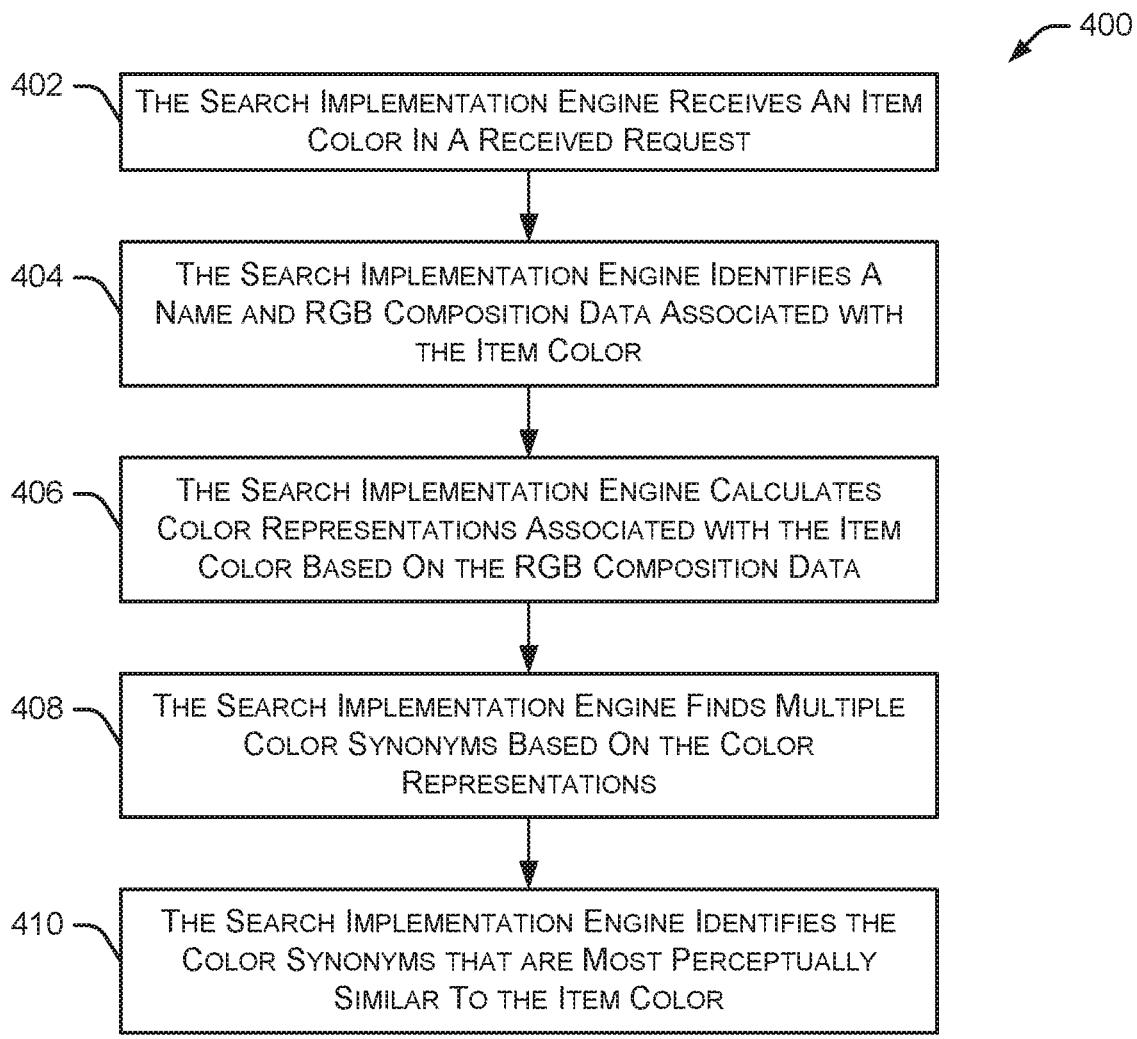
FIG. 4 is a flow diagram illustrating an embodiment of a method for identifying perceptually similar colors.

FIG. 4 is a flow diagram illustrating an embodiment of a method 400 for identifying perceptually similar colors. Initially, the search implementation engine receives 402 an item color in a received request. The search implementation engine then identifies 404 a name and RGB composition data associated with the item color. In some embodiments, the systems and methods described herein use the color name in the received request to find suitable RGB composition data. The RGB composition data can be determined based on datasets containing pairs, such as (name, RGB) pairs. For example, see FIG. 5. The requested color name is compared to all colors in the dataset and the RGB composition data of the best matching pair is returned. This matching procedure may include diverse "text matching" algorithms, such as the Levenshtein distance between strings. The datasets may be collected and created from multiple sources to provide a diverse dataset. Example sources of dataset information include:

Basic Colors: has 16 primary and secondary colors (red, blue, green, yellow, black, white, and so on)

Web-Safe Colors: has 140 well-known color names that are part of common vocabulary Wikipedia's List of Colors: has approximately 1500 more elaborate color names Fantasy Colors: has approximately 1400 "fantasy" color names that are derived from real-world objects, foods, fruits, and the like Hexa's List of Colors: has approximately 750 colors extracted from a website www.colorhexa.com Pantone Cotton: has approximately 2100 colors extracted from the Pantone Fashion+Home guide for the textile industry (e.g., cotton)

Pantone Paper: has approximately 2100 colors extracted from the Pantone Fashion+Home guide for the graphical industry (e.g., paper)

Method 400 continues as the search implementation engine calculates 406 color representations associated with the item color based on the RGB composition data. The color representations transform the RGB composition data into a suitable space for comparison of different colors. The search implementation engine then finds 408 multiple color synonyms based on the color representations. Example approaches to finding color synonyms are discussed in greater detail below. Method 400 continues as the search implementation engine identifies 410 the color synonyms that are most perceptually similar to the item color, as discussed in greater detail below. The color synonyms that are most perceptually similar to the item color are those that appear similar to a human viewing the multiple colors.

Color is the characteristic of human visual perception described through color categories, with specific names such as red, blue, yellow, orange, and the like. The perception of color is based on the stimulation of cone cells in the human eye by electromagnetic radiation in the spectrum of light. Color categories and physical specifications of color are associated with objects through the wavelength of the light that is reflected by them. The reflection is based on the object's physical properties such as light absorption, emission spectra, and the like.

Color perception by a person is based on how the human brain understands different wavelengths of light as they reach the human eye. The human body reduces the composition of wavelengths and light intensity into three color components. The human eye has three types of light-sensitive photoreceptor cells, called cone cells, that respond mostly to yellow (long wavelength or L), green (medium wavelength or M), and violet (short wavelength or S) light at peak wavelengths near 570 nm, 540 nm, and 440, respectively. The difference in the signals received from the three kinds of light allows the human brain to differentiate a wide variety of different colors. The cone cells capture the intensity of colors associated with a particular wavelength. The output of each cone cell is determined by the amount of light that corresponds to a range of wavelengths, where different wavelengths produce a different response from the cone cells. The three types of cone cells generate three signals based on the extent to which each cone cell is stimulated. The amount of stimulation may be referred to as tristimulus values.

By defining a color space or color representation, colors can be described numerically by coordinates or features. This allows for the characterization and operation with colors mathematically. In some embodiments, the perception of color can be described using a mixture of three colors called "primaries" or "primary colors." For example, this approach is used to reproduce color scenes in photography, printing, television, and other media. There are different color spaces for specifying a color in terms of primary colors, such as RYB (Red, Yellow, Blue), RGB (Red, Green, Blue), and CMY (Cyan, Magenta, Yellow). Other color spaces consider different properties, such as hue, luminosity, chroma, combinations of colors, etc. Examples of these color spaces include HSL/HSV (Hue, Saturation, Luminance/Value), XYZ, LCH (Lightness, Chroma, Hue), and LAB (Luminance, color channel A, color channel B).

The RGB representation divides colors into three basic elements: red, green, and blue. Each color element has a value ranging from 0 to 255 that indicates the intensity of the associated color element. HSL and HSV are cylindrical representations of RGB points. HSL and HSV are intended to transform the cubical geometry of RGB to make the color model more perceptually relevant to the human eye. The XYZ color space includes all color sensations the human eye can experience by modeling tristimulus values. The LAB color representation (or color space) includes colors that are defined independently of the nature of their creation or the device on which they are displayed. The LAB color space includes a three-dimensional real number space that contains an infinite number of possible representations of colors.

In some embodiments, the color comparison process makes use of the mathematical representations of colors and one or more distance measurement formulas. Several example distance measurement formulas are discussed below.

In particular embodiments, differences between colors are computed by applying algebraic equations, such as the Euclidean distance computation. Given two RGB colors $(r_1, g_1, b_1)$ and $(r_2, g_2, b_2)$, the Euclidean distance is calculated by the following equation:

$$\sqrt{(r_2-r_1)^2+(b_2-b_1)^2+(g_2-g_1)^2}$$

In some situations, the above equation does not accurately represent what a human eye actually perceives. An alternative equation adjusts the representation values to better fit human perception. The alternative equation weights the red, green, and blue components with different values, such as 30% for red, 59% for green, and 11% for blue, which takes into account the brightness of each color. Additionally, the alternative equation considers the degree to which human vision has less tolerance for certain colors by using coefficients of 2 for red, 4 for green, and 3 for blue. This alternative equation is represented as:

$$\sqrt{2\Delta r^2+4\Delta G^2+3\Delta B^2}$$

The international Commission on Illumination (CIE) introduced a color difference metric "Delta E" ($\Delta E$). The $\Delta E$ metric measures the change in visual perception, by the human eye, between two colors. The $\Delta E$ metric is based on the LAB color representation and produces values between 0.0 and 100.0. An example formula associated with the $\Delta E$ metric is:

$$\Delta E_{00} = \sqrt{\left(\frac{\Delta L'}{k_L S_L}\right)^2+\left(\frac{\Delta C'}{k_C S_C}\right)^2+\left(\frac{\Delta H'}{k_H S_H}\right)^2+R_T\frac{\Delta C'}{k_C S_C}\frac{\Delta H'}{k_H S_H}}$$

In the above equation, $\Delta L$ is the difference between the lightness of two colors, $\Delta C$ is the difference in chromaticity (i.e., relative saturation) of two colors, and $\Delta H$ is the arithmetic mean of the chord lengths of the equal chroma circles of the two colors. Additionally, $k_L$, is a weighting factor that depends on the application (1.0 for graphics arts and 2.0 for textiles), $s_L$ is a compensation for lightness (usually 1.0), $k_C$ and $k_H$ are weighting factors for chroma and hue (usually 1.0), and $S_C$ and $S_H$ provide compensation for chroma and hue (depending on the application). In particular, $S_C$=1+k1*c1 (chroma of first color),
$S_H$=1+k2*c2 (chroma of second color),
k1=0.045 for graphics arts and k1=0.048 for textiles,
k2=0.015 for graphics arts and k2=0.014 for textiles, and
$R_T$=a hue rotation compensation to deal with the problematic blue region (hue angles in the neighborhood of 275 degrees).

Although colors can be represented mathematically, people often use a naming schema to refer to a particular color. Since colors can be transformed from one representation to another, it is possible to compile datasets of RGB colors along with their names based on various information available from any number of data sources. FIG. 5 is a table 500 illustrating example color names and the associated RGB values. For example, Navy has RGB values (0, 0, 128), Fire Brick has RGB values (178, 34, 34), and so forth.

In some embodiments, color synonyms are computed based on the LAB color representation and the Delta E difference metric (e.g., the 2000 version of the Delta E calculation illustrated in the equation above). In particular embodiments, color similarities are categorized as follows:

$0<\Delta E<2.3$ Almost identical to a human viewer
$2.3<\Delta E<10$ Very similar to a human viewer
$10<\Delta E<20$ Similar to a human viewer, but not identical
$20<\Delta E$ Not similar to a human viewer As discussed above with respect to FIG. 4, a method for identifying perceptually similar colors receives an input color (e.g., from a search request) and determines the name of the input color and the RGB representation of the input color. The method transforms the RGB representation of the input color into a color space suitable for comparison, such as the LAB color space. The method then uses a distance measure to compare the input color with other colors (e.g., using $\Delta E$ as discussed herein). The colors are then sorted based on their similarity to the input color (e.g., lower $\Delta E$ values are more perceptually similar to one another). The colors may be filtered based on, for example, a threshold value indicating a limit of similar colors. For example, a $\Delta E$ threshold of 20 indicates similar colors (if $\Delta E$ is less than 20 there is similarity between the colors, and if $\Delta E$ is greater than 20 there is little similarity (or no similarity)).

FIG. 6 is a table 600 illustrating similarities between multiple pairs of colors. As shown in table 600, the difference (or distance) between color 1 and color 2 is measured by calculating $\Delta E$, as discussed herein. The perceptual similarity of color 1 and color 2 is based on the value of $\Delta E$.

FIG. 7 is a table 700 illustrating similarities between the color "red" and other color names, such as brick red, crimson, and cranberry. The difference (or distance) between "red" and each of the other color names is measured by calculating $\Delta E$, as described herein. After calculating the $\Delta E$ for each color pair, the values of $\Delta E$ are ranked such that the color pairs with the lowest $\Delta E$ values have the highest perceptual similarity (i.e., the color synonyms).

Figure 8:
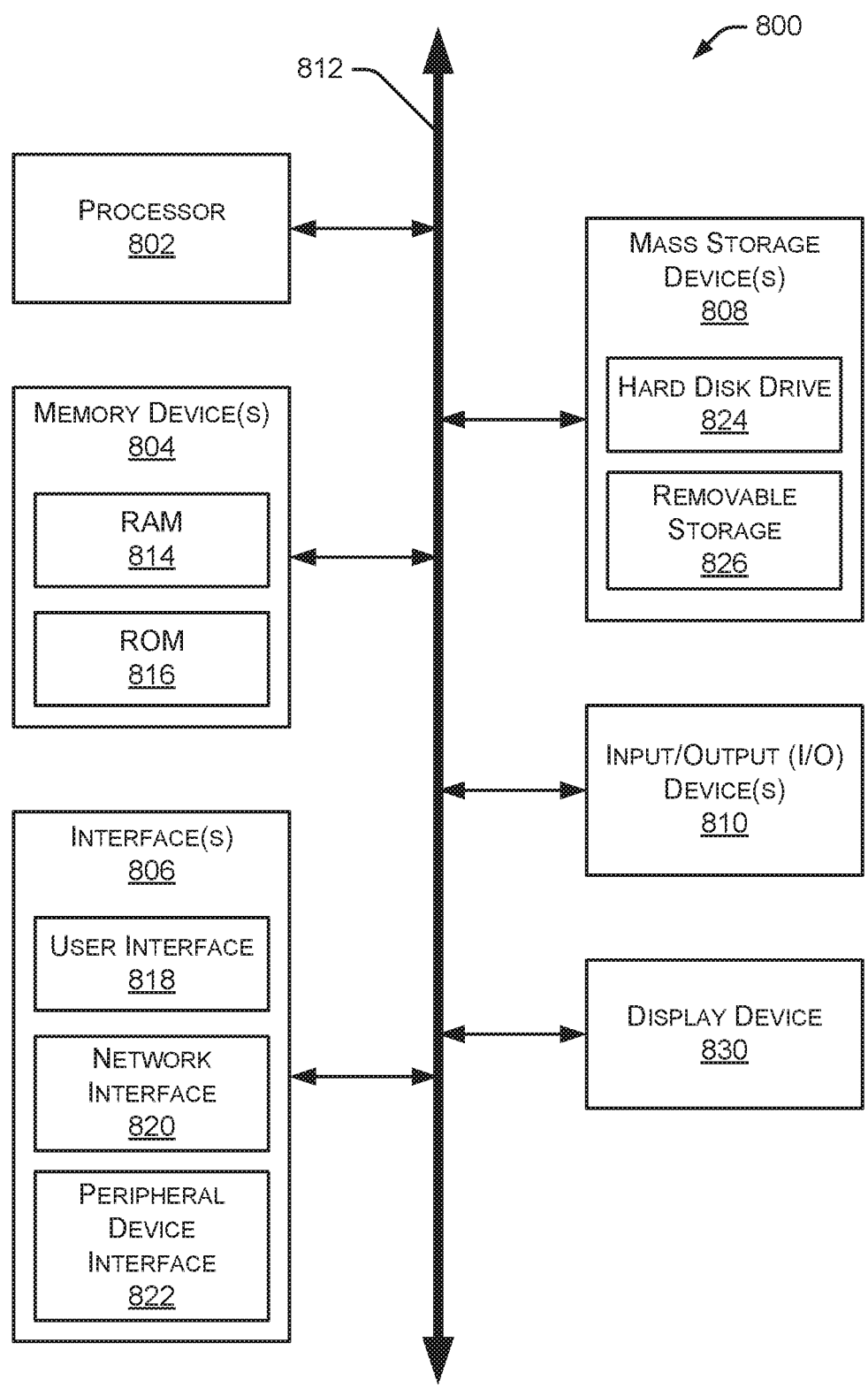
FIG. 8 is a block diagram illustrating an example computing device suitable for implementing the systems and methods described herein.

FIG. 8 is a block diagram illustrating an example computing device 800 suitable for implementing the systems and methods described herein. The search implementation engine 102, computing systems 104-108, and servers 120-122 may also have some or all of the attributes of the computing device 800. In some embodiments, a cluster of computing devices interconnected by a network may be used to implement any one or more components of the invention.

Computing device 800 may be used to perform various procedures, such as those discussed herein. Computing device 800 can function as a server, a client, or any other computing entity. Computing device can perform various monitoring functions as discussed herein, and can execute one or more application programs, such as the application programs described herein. Computing device 800 can be any of a wide variety of computing devices, such as a desktop computer, a notebook computer, a server computer, a handheld computer, tablet computer and the like.

Computing device 800 includes one or more processor(s) 802, one or more memory device(s) 804, one or more interface(s) 806, one or more mass storage device(s) 808, one or more Input/Output (I/O) device(s) 810, and a display device 830 all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device is a hard disk drive 824. Various drives may also be included in mass storage device(s) 808 to enable reading from and/or writing to the various computer readable media. Mass storage device(s) 808 include removable media 826 and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, lenses, CCDs or other image capture devices, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more user interface elements 818. The interface(s) 806 may also include one or more peripheral interfaces such as interfaces for printers, pointing devices (mice, track pad, etc.), keyboards, and the like.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
    receiving, by a search implementation engine, a request for an item, wherein the request includes a first color text;
    identifying, by the search implementation engine, a color representation associated with the first color text;
    determining, by the search implementation engine, a second color perceptually similar to the first color text based on the color representation, wherein determining a second color perceptually similar to the first color text includes:
        identifying a first name and red green blue (RGB) composition data associated with the first color text, wherein the RGB composition data is determined by performing text matching with respect to a dataset containing (name, RGB) pairs;
        comparing the RGB composition data to all colors in the dataset; and
        identifying as the second color a best match between the RGB composition data and a (name, RGB) pair in the dataset;
    identifying, by the search implementation engine, an instance of the item having the second color; and
    communicating, by the search implementation engine, data associated with the instance of the item to a source of the request.

2. The method of claim 1, further comprising accessing the data associated with the instance of the item from a data source.

3. The method of claim 2, wherein the data associated with the instance of the item includes at least one of a color, a style, a size, and an item description.

4. The method of claim 1, wherein identifying the color representation associated with the first color text includes transforming the RGB composition data associated with the first color text into a second color space.

5. The method of claim 4, wherein transforming the RGB composition data associated with the first color text into a second color space includes transforming the first color text into a Luminance, color channel A, color channel B (LAB) color space.

6. The method of claim 1, wherein determining a second color perceptually similar to the first color text includes determining a Delta E between the first color text and the second color.

7. The method of claim 6, wherein the Delta E is determined based on Luminance, color channel A, color channel B (LAB) values associated with the first color text and LAB values associated with the second color.

8. The method of claim 1, wherein the source of the request is a computing system that is remote from the search implementation engine.

9. The method of claim 1, wherein the request further includes a third color, and wherein the search implementation engine determines second colors that are perceptually similar to the first color text or the third color.

10. A method comprising:
    receiving, by a search implementation engine, a request for an item, wherein the request includes a first color text;
    identifying, by the search implementation engine, a color representation associated with the first color text;
    determining, by the search implementation engine, a plurality of second colors that are perceptually similar to the first color text based on the color representation, wherein determining the plurality of second colors that are perceptually similar to the first color text includes:
        identifying a name and read green blue (RGB) composition data associated with the first color text, wherein the RGB composition data is determined by performing a text matching algorithm with respect to a dataset containing (name, RGB) pairs;
        comparing the RGB composition data associated with the first color text to all colors in the dataset; and
        identifying, as the plurality of second colors, best matches between the RGB composition data associated with the first color text and a plurality of (name, RGB) pairs in the dataset;
    identifying, by the search implementation engine, a plurality of items each having an associated color that is any of the first color text and one of the plurality of second colors;
    ranking the plurality of items based on perceptual similarity of each item's associated color to the first color text; and
    communicating data associated with the plurality of items to a source of the request.

11. The method of claim 10, further comprising accessing the data associated with the plurality of items from a data source.

12. The method of claim 11, wherein the data associated with each item of the plurality of items includes at least one of a color, a style, a size, and an item description.

13. The method of claim 10, wherein identifying a color representation associated with the first color text includes transforming the RGB composition data associated with the first color text into a second color space.

14. The method of claim 13, wherein transforming the first color text into a second color space includes transforming the RGB composition data associated with the first color text into a LAB color space.

15. The method of claim 10, wherein determining a second color perceptually similar to the first color text includes determining a Delta E between the first color text and the second color.

16. The method of claim 15, wherein the Delta E is determined based on Luminance, color channel A, color channel B (LAB) values associated with the first color text and Luminance, color channel A, color channel B (LAB) values associated with the second color.

17. The method of claim 10, wherein the request further includes a third color, and wherein the search implementation engine determines second colors that are perceptually similar to the first color text or the third color.

18. An apparatus comprising:
a communication module configured to receive a request for an item, wherein the request includes a first color text;
a color analysis module configured to identify a color representation associated with the first color text;
a color synonym module configured to determine a second color perceptually similar to the first color text based on the color representation, wherein the color synonym module determines a second color perceptually similar to the first color text by:
  identifying a name and red green blue (RGB) composition data associated with the first color text, wherein the RGB composition data is determined by performing text matching of the first color text with respect to a dataset containing (name, RGB) pairs;
  comparing the RGB composition data associated with the first color text to all colors in the dataset; and
  identifying as the second color a best match between the first color text and a (name, RGB) pair in the dataset; and
an item search manager configured to identify an instance of the item having the second color and identify data associated with the instance of the item.

19. The apparatus of claim 18, wherein the communication module is further configured to communicate the data associated with the instance of the item to a source of the request.

20. The apparatus of claim 18, wherein the data associated with the instance of the item includes at least one of a color, a style, a size, and an item description.

* * * * *